(12) United States Patent
Lota

(10) Patent No.: US 10,234,875 B2
(45) Date of Patent: Mar. 19, 2019

(54) CHANGING VEHICLE COMPONENT SETTINGS TO RETAIN CARGO WITHIN THE VEHICLE

(71) Applicant: Toyota Motor Engineering & Manufacturing North America, Inc., Erlanger, KY (US)

(72) Inventor: Charan S. Lota, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 193 days.

(21) Appl. No.: 15/332,715

(22) Filed: Oct. 24, 2016

(65) Prior Publication Data

US 2018/0113480 A1 Apr. 26, 2018

(51) Int. Cl.
*B65G 67/00* (2006.01)
*G05D 3/10* (2006.01)
*B60R 5/04* (2006.01)

(52) U.S. Cl.
CPC .............. *G05D 3/10* (2013.01); *B60R 5/04* (2013.01)

(58) Field of Classification Search
CPC ........... G06T 17/00; G06T 2207/30108; G06T 17/30232; G06T 7/0004; G06T 7/70; G02F 1/29; G02F 1/134309; G01B 11/28; G05D 3/10; G01C 21/34; B60R 1/00; B60R 5/04

USPC ..... 701/300, 49; 297/344.1, 335; 244/118.1; 296/24.33, 26.01, 64
See application file for complete search history.

(56) References Cited

U.S. PATENT DOCUMENTS

| | | | |
|---|---|---|---|
| 2003/0164622 A1* | 9/2003 | De Gaillard | B60P 3/40 296/26.09 |
| 2004/0035631 A1* | 2/2004 | Schlecht | B60R 5/047 180/271 |
| 2007/0265754 A1 | 11/2007 | Curtis et al. | |
| 2010/0073476 A1* | 3/2010 | Liang | G06Q 10/08 348/136 |
| 2016/0047646 A1 | 2/2016 | Ochsendorf et al. | |

* cited by examiner

*Primary Examiner* — Dalena Tran
(74) *Attorney, Agent, or Firm* — Christopher G. Darrow; Darrow Mustafa PC

(57) ABSTRACT

Described herein are systems and methods for retaining cargo. A system for retaining cargo may comprise a sensor and a system controller. The system controller may be configured to determine presence of cargo in a vehicle; determine dimensions of the cargo based, at least in part, on data received from the sensor; determine a storage location for the cargo based, at least in part, on one or more of: the dimensions of the cargo, interior dimensions of the vehicle, and interior components of the vehicle; determine a first position for a first one of the interior components, the first position determined based, at least in part, on one or more of: the storage location, and a location for retaining the cargo for transport; create a first message indicating the storage location for the cargo and the position for the first one of the interior components; and transmit the message.

20 Claims, 4 Drawing Sheets

CHANGING VEHICLE COMPONENT SETTINGS TO RETAIN CARGO WITHIN THE VEHICLE

TECHNICAL FIELD

The subject matter described herein relates in general to transporting cargo in a vehicle and, more particularly, to changing vehicle component settings to retain cargo within the vehicle.

BACKGROUND

Vehicles are often used to transport cargo. Cargo of various sizes are transported in various areas of a vehicle. Some cargo may be fragile or otherwise susceptible to damage if not properly secured during transportation.

SUMMARY

This disclosure describes various embodiments for changing vehicle component settings to retain cargo within the vehicle. In one embodiment, a system for retaining cargo may comprise a sensor and a system controller. The system controller may be configured to determine presence of cargo in a vehicle; determine dimensions of the cargo based, at least in part, on data received from the sensor; determine a storage location for the cargo based, at least in part, on one or more of: the dimensions of the cargo, interior dimensions of the vehicle, and interior components of the vehicle; determine a first position for a first one of the interior components, the first position determined based, at least in part, on one or more of: the storage location, and a location for retaining the cargo for transport; create a first message indicating the storage location for the cargo and the position for the first one of the interior components; and transmit the message.

In another embodiment, a method of retaining cargo may comprise determining presence of cargo in a vehicle; determining dimensions of the cargo based, at least in part, on data received from a sensor; determining a storage location for the cargo based, at least in part, on one or more of: the dimensions of the cargo, interior dimensions of the vehicle, and interior components of the vehicle; determining a first position for a first one of the interior components based, at least in part, on one or more of: the storage location, and a location for retaining the cargo for transport; creating a first message indicating the storage location for the cargo and the position for the first one of the interior components; and transmitting the message.

In another embodiment, a vehicle may comprise a sensor, a plurality of interior components, and a system controller. The system controller may be configured to determine presence of cargo in the vehicle; determine dimensions of the cargo based, at least in part, on data received from the sensor; determine a storage location for the cargo based, at least in part, on one or more of: the dimensions of the cargo, interior dimensions of the vehicle, and the plurality of interior components of the vehicle; determine a first position for a first one of the plurality of interior components the first position determined based, at least in part, on one or more of: the storage location, and a location for retaining the cargo for transport; create a first message indicating the storage location for the cargo and the position for the first one of the plurality of interior components; and transmit the message.

DETAILED DESCRIPTION

Described herein are embodiments of systems and methods for changing vehicle component settings to retain cargo within the vehicle. Cargo may be transported in a vehicle. After the cargo is loaded into the vehicle a sensor in the vehicle may detect the cargo's presence. In an embodiment, the presence of the cargo may be indicated by a user of the system. When cargo is present in the vehicle, a sensor may determine the dimensions of the cargo. A system controller may use the dimensions of the cargo as well as information about the interior components of the vehicle to determine an optimal position for the cargo during shipment. The system controller may also determine an optimal position for the interior components during shipment. The optimal position may be a position that retains the cargo during shipment. For example, the system controller may determine the optimal position is behind the rear seat of the vehicle. The system controller may further determine that the rear seat should be adjusted rearward in order to retain the cargo. The adjustments to the interior components may be made automatically by the system controller, manually by a user, or some combination thereof.

Figure 1:
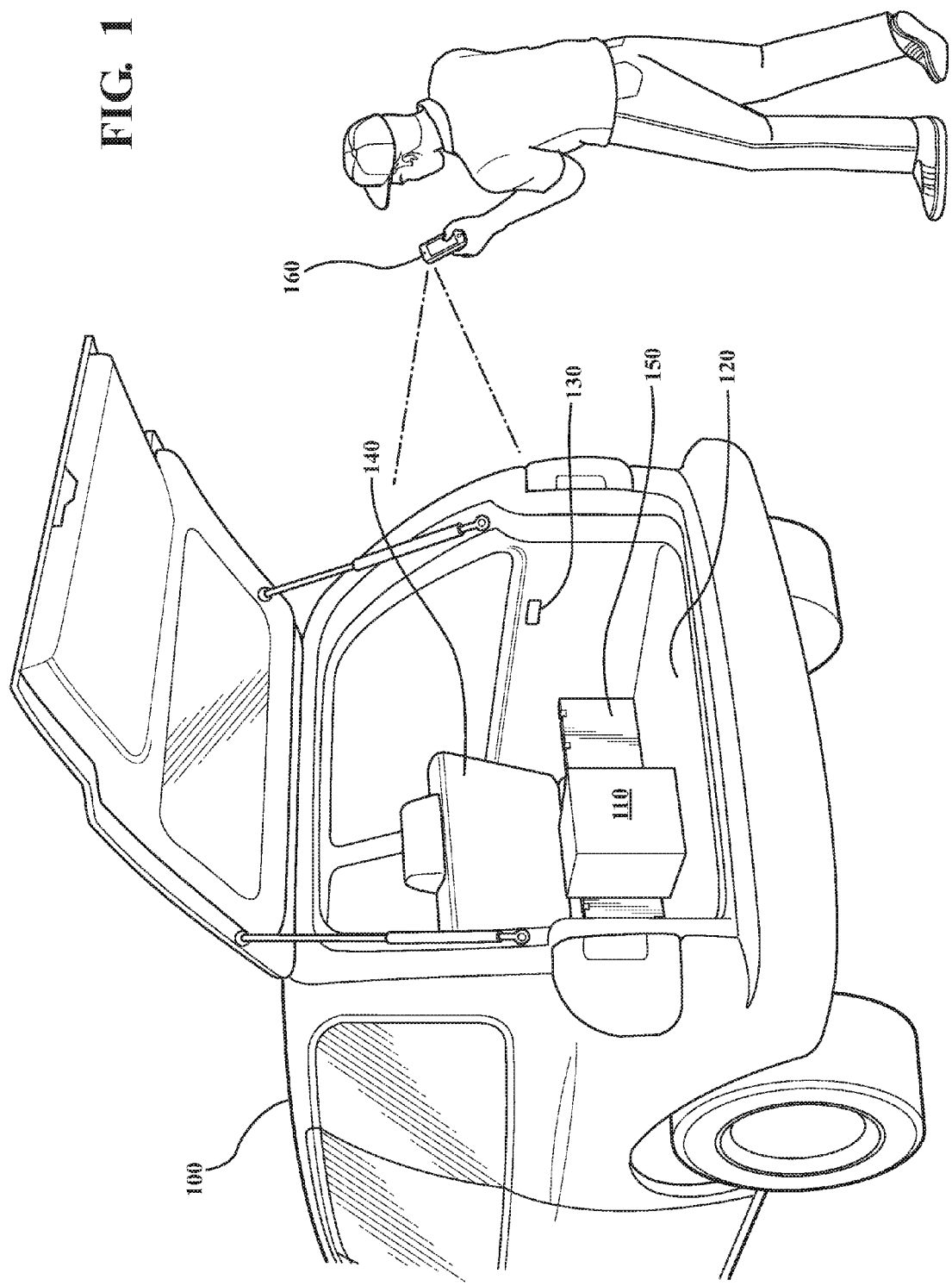
FIG. 1 is a diagram of an embodiment of a vehicle configured for cargo detection and retention.

FIG. 1 is a diagram of an embodiment of a vehicle 100 configured for cargo detection and retention. Vehicle 100 may have a cargo storage area 120. Cargo 110 may be placed in the cargo storage area 120. When cargo 110 is placed in cargo storage area 120, sensor 130 may detect the presence of the cargo 110. Sensor 130 may automatically activate or may be manually activated. In an embodiment, sensor 130 may be obscured or may not be present in vehicle 100. In this case, a mobile device 160 may be used to detect cargo 110. In any case, detecting the cargo 110 may include determining the dimensions of the cargo 110, determining placement of the cargo 110 within the cargo storage area 120, or other information.

Upon detecting cargo 110, a system controller (not pictured) may receive the detected information regarding the cargo 110. The system controller may determine an optimal placement of the cargo 110 in the vehicle 100. Optimal placement may include a location where the cargo 110 will be secured during travel. The system controller may also determine an optimal configuration of the interior components of the vehicle 100. The interior components may include rear seat 140 and retention wall 150. In other embodiments, more or less interior components may be configured for retaining the cargo 110. The system controller may be a standalone controller that only controls the cargo detection and retention system, or may be part of a larger controller that controls other systems of the vehicle 100.

The system controller may cause the interior components of vehicle 100 to reconfigure in order to secure cargo 110. For example, the system controller may cause retention wall 150 to move towards cargo 110. The retention wall 150 may prevent cargo 110 from shifting during travel. In yet another example, the system controller may cause the rear seat 140 to move towards the cargo 110 in order to prevent the cargo from shifting. If cargo 110 has a high center of gravity, seat 140 may be used to prevent cargo 110 from tipping. In other embodiments, retention wall 150 may be sized differently to fit in cargo storage area 120. In an embodiment, multiple retention walls may be present and may be automatically configured by the system controller. In an embodiment, one or more of the interior components of vehicle 100 may not be capable of automatic movements. In this case, a user may be prompted to move one or more of the interior components for retaining the cargo 110 during transportation.

In an embodiment, the system controller may determine that the cargo 110 should be secured somewhere else in the vehicle. The determination may be made based upon the dimensions of the cargo 110, occupancy of the vehicle and/or other factors.

Figure 2:
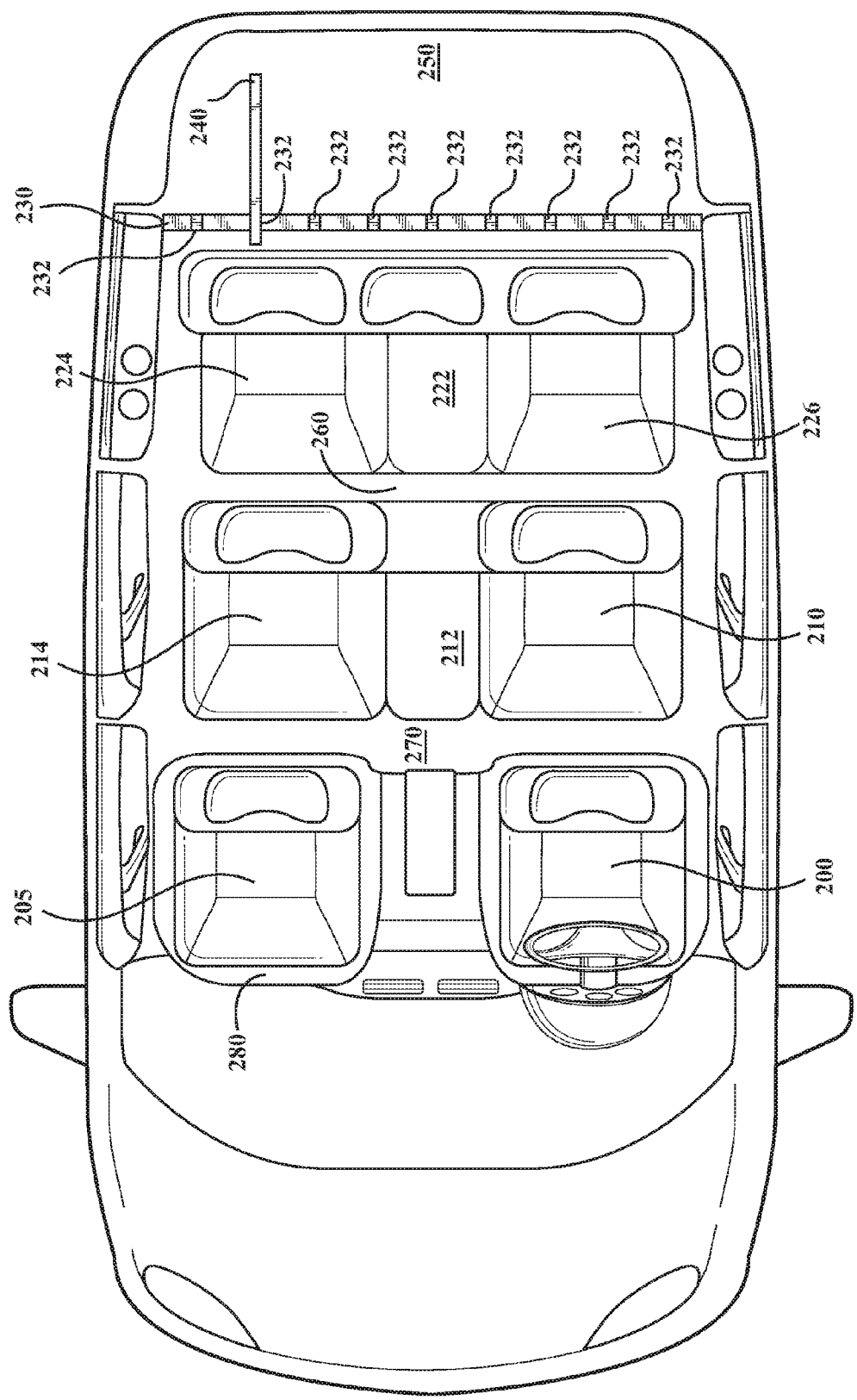
FIG. 2 is a diagram of an embodiment of an interior of a vehicle.

FIG. 2 is a diagram of an embodiment of an interior of a vehicle. The interior may comprise seating areas and a cargo storage area 250. The cargo storage area may comprise retention walls 230 and 240. Retention wall 230 may comprise several notches 232. The notches may be placed so that retention wall 230 may move forwards or backwards without interfering with retention wall 240. For example, retention wall 240 may be aligned with a notch 232 to allow retention wall 230 to move towards the rear of the vehicle.

A user may place some cargo, e.g., cargo 110, into cargo storage area 250. A system controller may cause a sensor in the vehicle to determine characteristics of the cargo, e.g., dimensions and locations within the vehicle. In an embodiment, a user may use a mobile device or some other sensor not part of the vehicle to determine the characteristics of the cargo. Sensors for detecting characteristics may include optical sensors, e.g., a camera; sonic sensors, e.g. ultrasonic; electromagnetic, e.g., radar; light sensors, e.g., laser; or some other sensor.

The system controller may determine an optimal location and an optimal configuration of the vehicle interior for transport of the cargo. For example, cargo may be stored in cargo storage area 250, the system controller may move retention walls 230 and 240 to secure the cargo. In another example, system controller may determine cargo should be stored in one of passenger areas 205, 210, 212, 214, 226, 222, or 224. In some cases cargo may stretch across several passenger areas. In yet another example, the system controller may determine that the cargo is optimally placed in one of floor boards 280, 270, or 260. The system controller may inform the user of the optimal location for the cargo if the cargo is not already in the optimal location. In an embodiment, the system controller may wait to reconfigure the vehicle interior until the driver is in driver seat 200. This may allow time for other passengers to enter the vehicle which may impact the system controller's determination of optimal location. For example, if a passenger is in passenger area 205, the system controller may not recommend that area as an optimal storage location.

Figure 3:
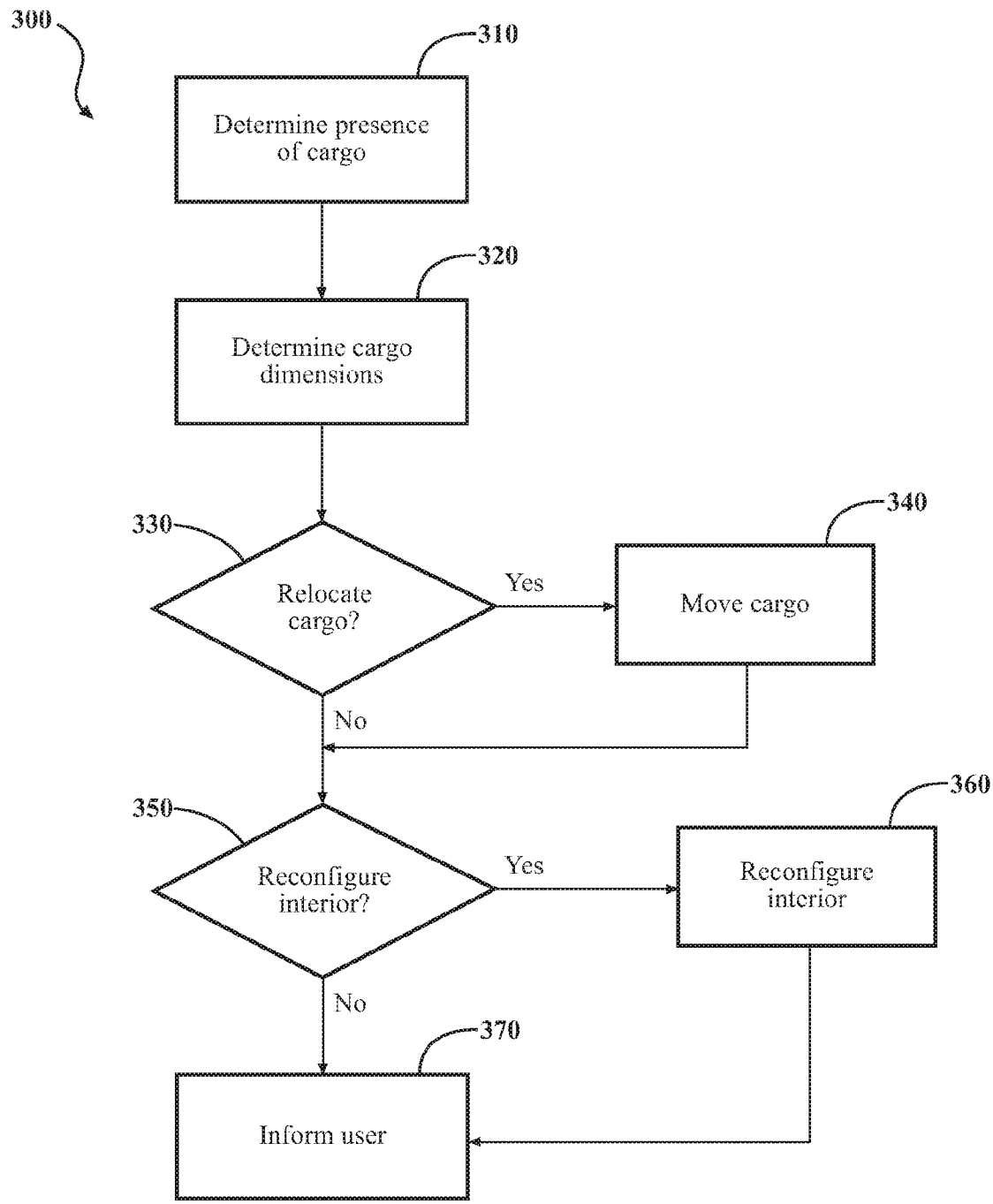
FIG. 3 is a block diagram of an embodiment of a method for retaining cargo within a vehicle.

FIG. 3 is a block diagram of an embodiment of a method 300 for retaining cargo within a vehicle. The method 300 may begin at block 310 when a system controller uses one or more sensors, e.g., sensor 130, to determine the presence of cargo in the vehicle. The system controller may periodically scan for cargo at a predetermined interval. The system controller may scan for cargo whenever vehicle doors are opened and/or closed. The system controller may scan for cargo based upon receiving a command from a user. The preceding are meant to be examples of when the system controller may scan and not an exhaustive list.

After the system controller has determined the presence of cargo in the vehicle, the system controller may determine dimensions of the cargo at block 320. The system controller may use sensors present in the vehicle, e.g., sensor 130, to determine the dimensions of the cargo and/or the system controller may use other sensors not part of the vehicle, e.g., a mobile device 160 with a camera. The sensors for determining the dimensions may be any sensor capable of measuring or enabling measurement of the cargo. For example, an optical sensor, e.g., a camera; an electromagnetic sensor, e.g., radar; or a sonic sensor, e.g., ultrasonic. More than one sensor and/or more than one type of sensor may be used in determining the cargo dimensions.

At block 330, the system controller may determine whether the cargo should be relocated. The system controller may be programmed with interior dimensions of the vehicle, or may consult a database for the interior dimensions of the vehicle. The database may be stored locally or remotely. The system controller may also consider the current configuration of the interior of the vehicle, e.g., are seats folded down or removed from the vehicle. The system controller may consider the occupancy of the vehicle. The system controller may also consider the dimensions of the cargo, the cargo may be a single piece of multiple pieces and the system controller may determine to relocate some or all pieces of the cargo.

If the system controller determines to relocate the cargo, a message may be transmitted indicating the cargo should be moved and/or where the cargo should be moved to. The message may be audio, video, or both. The message may be presented via one or more of a video display in the vehicle, the audio system of the vehicle, and/or a user's mobile device. The message may indicate which pieces of cargo should be moved and where the cargo should be moved to. In an embodiment, a user may indicate that the cargo has been moved, or that the cargo cannot be moved to the suggested location. The user may indicate via the vehicle or a mobile device. In the case where the cargo cannot be moved to the suggested location, e.g., a passenger is in the suggested location, the system controller may determine an alternate location for the cargo.

At block 350, the system controlled may determine whether or not to reconfigure the interior of the vehicle. The system controller may be store information regarding interior components, e.g. retention wall 150 or seat 140. The system controller may also store dimensions of the vehicle. The system controller may consult a database for the interior components and dimensions of the vehicle. The database may be stored locally or remotely. The system controller may also consider the current configuration of the interior of the vehicle, e.g., are seats folded down or removed from the vehicle. The system controller may consider the occupancy of the vehicle. The system controller may also consider the dimensions of the cargo. Multiple interior components may be adjustable and the system controller may determine to reconfigure all, some, or none of the interior components. The system controller may notify a user prior to reconfiguring the interior. The user may approve or disapprove the reconfiguration. In an embodiment, certain interior components may need to be manually reconfigured by the user. In this case, the system controller may send a message indicating which interior components should be adjusted by the user. If the user disapproves a proposed reconfiguration, the system controller may determine an alternate configuration and propose the alternate configuration to the user.

At block 360, the interior components may be reconfigured as suggested by the system controller. The user may reconfigure the interior components, the system controller may automatically reconfigure the interior components, or some combination thereof may reconfigure the interior components. In an embodiment, the user or the system controller may determine reconfiguration is not possible. In this case, the user may notify the system controller, or the system controller may determine reconfiguration is not possible. If reconfiguration is not possible, the system controller may determine an alternate configuration and propose the alternate configuration to the user.

At block 370, the system controller may notify the user that the interior components are configured for transporting the cargo. The notification may be via the vehicle and/or a user device of the user.

Figure 4:
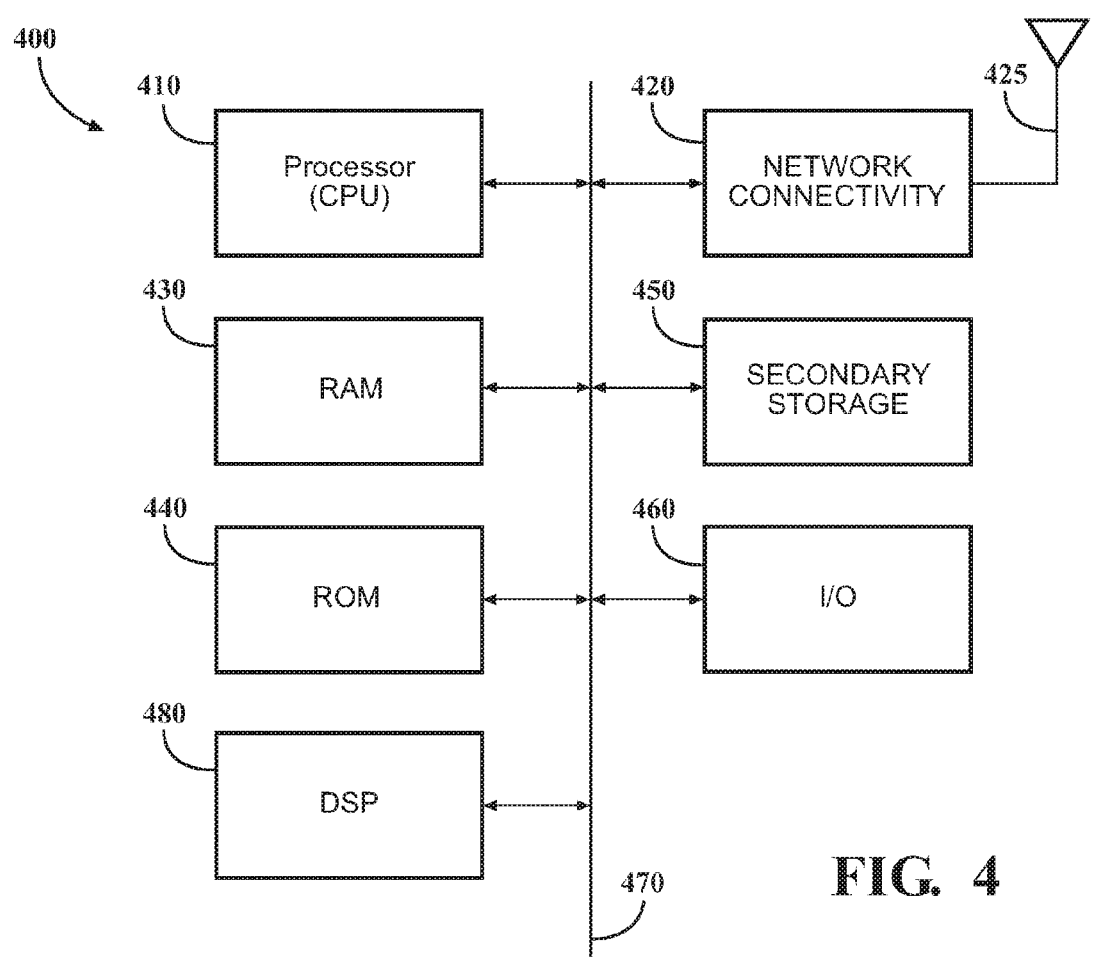
FIG. 4 is a diagram of an embodiment of a system suitable for implementing one or more embodiments disclosed herein.

FIG. 4 illustrates an example of a system 400 that includes a processor 410 suitable for implementing one or more embodiments disclosed herein, e.g., the system controller. The processor 410 may control the overall operation of the device.

In addition to the processor 410 (which may be referred to as a central processor unit or CPU), the system 400 might include network connectivity devices 420, random access memory (RAM) 430, read only memory (ROM) 440, secondary storage 450, and input/output (I/O) devices 460. These components might communicate with one another via a bus 470. In some cases, some of these components may not be present or may be combined in various combinations with one another or with other components not shown. These components might be located in a single physical entity or in more than one physical entity. Any actions described herein as being taken by the processor 410 might be taken by the processor 410 alone or by the processor 410 in conjunction with one or more components shown or not shown in the drawing, such as a digital signal processor (DSP) 480. Although the DSP 480 is shown as a separate component, the DSP 480 might be incorporated into the processor 410.

The processor 410 executes instructions, codes, computer programs, or scripts that it might access from the network connectivity devices 420, RAM 430, ROM 440, or secondary storage 450 (which might include various disk-based systems such as hard disk, floppy disk, or optical disk). While only one CPU 410 is shown, multiple processors may be present. Thus, while instructions may be discussed as being executed by a processor, the instructions may be executed simultaneously, serially, or otherwise by one or multiple processors. The processor 410 may be implemented as one or more CPU chips and may be a hardware device capable of executing computer instructions.

The network connectivity devices 420 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 420 may enable the processor 410 to communicate with the Internet or one or more telecommunications networks or other networks from which the processor 410 might receive information or to which the processor 410 might output information. The network connectivity devices 420 might also include one or more transceiver components 425 capable of transmitting and/or receiving data wirelessly.

The RAM 430 might be used to store volatile data and perhaps to store instructions that are executed by the processor 410. The ROM 440 is a non-volatile memory device that typically has a smaller memory capacity than the memory capacity of the secondary storage 450. ROM 440 might be used to store instructions and perhaps data that are read during execution of the instructions. Access to both RAM 430 and ROM 440 is typically faster than to secondary storage 450. The secondary storage 450 is typically comprised of one or more disk drives or tape drives and might be used for non-volatile storage of data or as an over-flow data storage device if RAM 430 is not large enough to hold all working data. Secondary storage 450 may be used to store programs that are loaded into RAM 430 when such programs are selected for execution.

The I/O devices 460 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 425 might be considered to be a component of the I/O devices 460 instead of or in addition to being a component of the network connectivity devices 420.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium.

What is claimed is:

1. A system for retaining cargo in a vehicle, the system comprising:
    a sensor; and
    a system controller configured to:
        in response to determining that the cargo is present within the vehicle, determine dimensions of the cargo according to at least data received from the sensor that perceives the cargo;
        determine a storage location of the cargo within the vehicle;
        determine a retention position for an interior component of the vehicle that prevents the cargo from moving while the vehicle is in transit; and
        automatically adjust a current position of the interior component into the retention position based, at least in part, on the storage location and the dimensions.

2. The system of claim 1, wherein the system controller configured to determine the retention position for the interior component includes determining the retention position for a retention wall that is adjustably movable, wherein automatically adjusting the interior component includes moving the retention wall toward the cargo that is existing within the vehicle to secure the cargo for transport, and
    wherein the system controller is configured to determine that the cargo is present in the vehicle comprises at least one of:
        the system controller configured to receive an indicator to determine whether the cargo is present; and
        the system controller configured to automatically determine whether the cargo is present at regular intervals.

3. The system of claim 1, wherein the system controller is further configured to:
    transmit a message indicating the storage location for the cargo and the position for the interior component;
    receive a response to the message indicating approval; and
    automatically reconfigure the interior component.

4. The system of claim 3, wherein the system controller is further configured to:
    receive a response to the message indicating disapproval; and
    determine one or more of:
        an alternate position for the interior component; and
        an alternate storage location for the cargo.

5. The system of claim 1, wherein the system controller is further configured to:
    determine an adjustment position for an additional component in order to retain the cargo for transport, wherein the additional component is a seat of the vehicle.

6. The system of claim 1, wherein the system controller is further configured to
    delay determining the retention position until a passenger of the vehicle is seated in the vehicle, wherein determining the retention position includes determining the retention position for the interior component and a seat position for at least one seat in the vehicle according to a passenger position of the passenger.

7. The system of claim 1, wherein the sensor is external to the vehicle and wherein the system controller is configured to determine the dimensions of the cargo including receiving the data from the sensor that is a mobile device.

8. A method of retaining cargo in a vehicle, the method comprising:
    in response to determining that the cargo is present within the vehicle, determining dimensions of the cargo according to at least data received from a sensor that perceives the cargo;
    determining a storage location of the cargo within the vehicle;
    determining a retention position for an interior component of the vehicle that prevents the cargo from moving while the vehicle is in transit; and
    automatically adjusting based, at least in part, on the storage location and the dimensions a current position of the interior component into the retention position.

9. The method of claim 8, wherein determining the retention position for the interior component includes determining the retention position for a retention wall that is adjustably movable, wherein automatically adjusting the interior component includes moving the retention wall toward the cargo to secure the cargo for transport, and
    wherein determining that the cargo is present in the vehicle comprises at least one of:
        receiving an indicator to determine whether the cargo is present; and
        automatically determining whether the cargo is present at regular intervals.

10. The method of claim 8, further comprising:
    transmitting a message indicating the storage location for the cargo and the position for the interior component;
    receiving a response to the message indicating approval; and
    automatically reconfiguring the interior component.

11. The method of claim 10, further comprising:
    receiving a response to the message indicating disapproval; and
    determining one or more of:
        an alternate position for the interior component; and
        an alternate storage location for the cargo.

12. The method of claim 8, further comprising:
    determining an adjustment position for an additional component in order to retain the cargo for transport, wherein the additional component is a seat of the vehicle.

13. The method of claim 8, further comprising:
    delaying determining the retention position until a passenger of the vehicle is seated in the vehicle, wherein determining the retention position includes determining the retention position for the interior component and a seat position for at least one seat in the vehicle according to a passenger position of the passenger.

14. The method of claim 8, wherein the sensor is external to the vehicle, and wherein determining the dimensions of the cargo includes receiving the data from the sensor that is a mobile device.

15. A vehicle, comprising:
a sensor;
a plurality of interior components; and
a system controller configured to:
in response to determining that cargo is present within the vehicle, determine dimensions of the cargo according to at least data received from the sensor that perceives the cargo;
determine a storage location of the cargo within the vehicle;
determine a retention position for an interior component of the vehicle that prevents the cargo from moving while the vehicle is in transit; and
automatically adjust based, at least in part, on the storage location and the dimensions a current position of the interior component into the retention position.

16. The vehicle of claim 15,
wherein the system controller is configured to determine the retention position for the interior component including determining the retention position for a retention wall that is adjustably movable,
wherein the system controller is configured to automatically adjusting the interior component including moving the retention wall toward the cargo that is existing within the vehicle to secure the cargo for transport, and
wherein the system controller is configured to determine that the cargo is present in the vehicle by performing at least one of:
receiving an indicator to determine whether the cargo is present; and
automatically determining whether the cargo is present at regular intervals.

17. The vehicle of claim 15, wherein the system controller is further configured to:
transmit a message indicating the storage location for the cargo and the position for the interior component;
receive a response to the message indicating approval; and
automatically reconfigure the interior component.

18. The vehicle of claim 17, wherein the system controller is further configured to:
receive a response to the message indicating disapproval; and
determine one or more of:
an alternate position for the interior component; and
an alternate storage location for the cargo.

19. The vehicle of claim 15, wherein the system controller is further configured to
determine an adjustment position for an additional component in order to retain the cargo for transport, and wherein the additional component is a seat of the vehicle.

20. The vehicle of claim 15, wherein the system controller is further configured to delay determining the retention position until a passenger of the vehicle is seated in the vehicle, wherein determining the retention position includes determining the retention position for the interior component and a seat position for at least one seat in the vehicle according to a passenger position of the passenger.

* * * * *